W. MAYER.
LIMBER CONNECTION.
APPLICATION FILED MAY 8, 1912.
1,098,281.
Patented May 26, 1914.
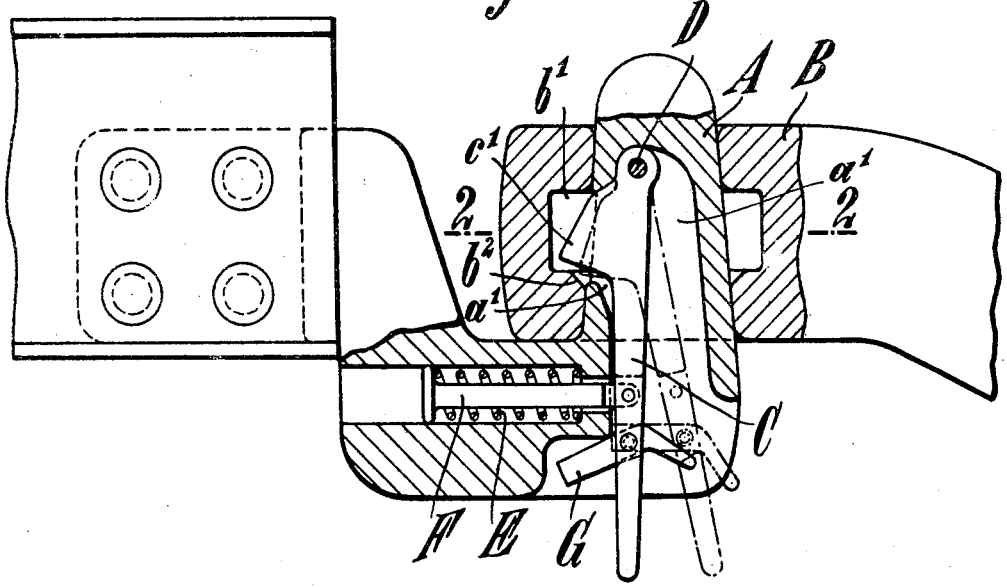
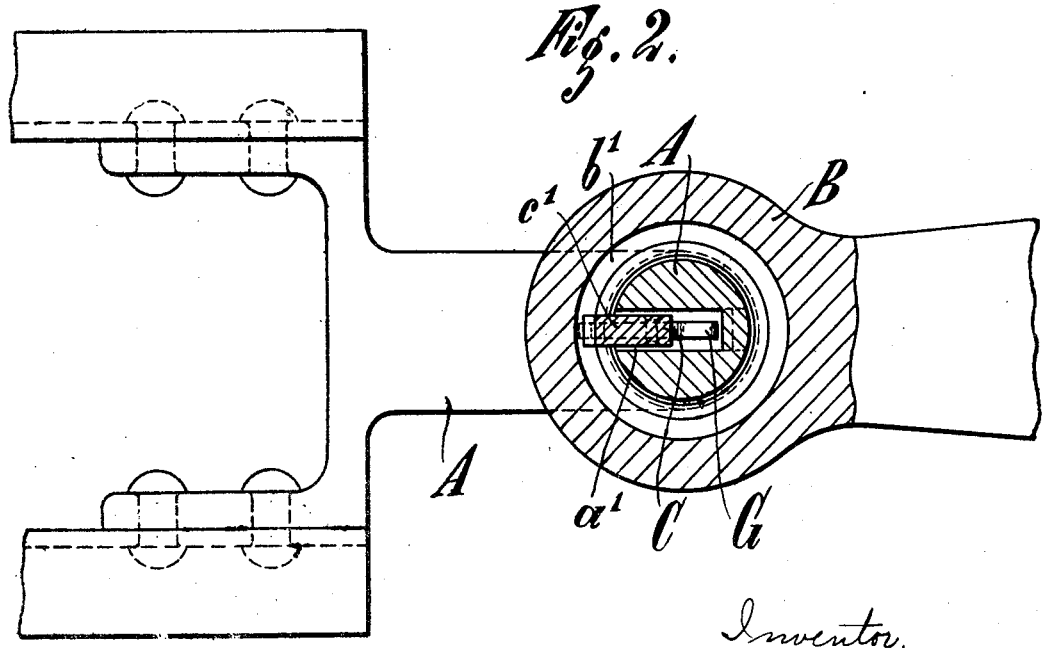

UNITED STATES PATENT OFFICE.

WILHELM MAYER, OF ESSEN-ON-THE-RUHR, GERMANY, ASSIGNOR TO FRIED. KRUPP AKTIENGESELLSCHAFT, OF ESSEN-ON-THE-RUHR, GERMANY.

LIMBER CONNECTION.

1,098,281.  Specification of Letters Patent.  Patented May 26, 1914.

Application filed May 8, 1912. Serial No. 695,934.

*To all whom it may concern:*

Be it known that I, WILHELM MAYER, residing at Essen-on-the-Ruhr, Germany, a subject of the Emperor of Germany, have invented a certain new and useful Improvement in Limber Connections, of which the following is a specification.

The invention relates to limber connections and particularly to those which have an eye closely surrounding the limber hook and a latch for the same.

The invention has for its purpose to provide a limber connection of this kind which is rendered easy to manipulate by compact construction and pleasing appearance.

One embodiment of the limber connection is disclosed in the accompanying drawing, in which, Figure 1 is a side view partly in section; and Fig. 2 is an appurtenant top view, partly in section on the line 2—2 of Fig. 1.

A designates the limber hook, B the trail eye and C the latch therefor. The latch C is mounted in a recess $a^1$ of the limber hook A and is rotatable upon a bolt D. It is secured in its locking position, yieldingly, by a spring E acting through the medium of a plunger F. The latch C projects with its nose $c^1$ out of the recess $a^1$ of the limber hook A, when the parts are coupled up, and enters an inner recess $b^1$ of the trail eye to prevent unintentional raising of the trail eye B from the limber hook A.

Rotatably mounted upon the latch C is a two-armed dog G, the arrangement being such that the latch C, when the dog G rises against the wall of the recess $a^1$ in the wall of the limber hook, will be held thereby in a position in which its nose $c^1$ projects only in a slight measure beyond the limber hook (see dotted line position in Fig. 1). The arm of the dog G projecting to the left in the drawing, is heavier than that projecting to the right. Finally the lower corner of the recess $b^1$ of the trail eye B is tapered off for a purpose to be mentioned below (see $b^2$, Fig. 1).

If unlimbering is to take place, the latch C and the dog G are brought by hand in the position indicated in dotted lines, Fig. 1. Then the trail eye is lifted from the limber hook. By this movement, the trail eye impinges with its inclined face $b^2$ against the nose $c^1$ of the latch C so that the nose $c^1$, in consequence of its coöperation with the inclined face $b^2$ of the trail eye, will be pushed back. At the same time, the dog G relinquishes its abutment against the wall of the recess $a^1$ and swings out of its locking position, the weight of its left arm, as explained, being greater than that of the right arm. In consequence of this, the latch C, as soon as it has released the trail eye, will be returned, under the action of the spring E to its locking position, shown in full lines in Fig. 1. In limbering up, the latch C first yields to the trail eye and then returns under the action of the spring E to its locking position.

I claim:—

1. A limber coupling comprising a limber hook, a trail eye fitting closely around said hook, a spring actuated latch in the part of said hook engaging the trail eye, said latch normally engaging said eye to lock it to the hook while permitting lateral oscillation.

2. A limber coupling comprising a limber hook, a trail eye fitting closely around said hook, a spring actuated latch in the part of said hook engaging the trail eye, said latch normally engaging said eye internally to lock it to the hook while permitting lateral oscillation; said hook having a chamber wherein said latch is mounted to oscillate for engaging and disengaging said trail eye.

3. A limber coupling comprising a limber hook, a trail eye fitting closely around said hook, a spring actuated latch in the part of said hook engaging the trail eye, said latch normally engaging said eye internally to lock it to the hook while permitting lateral oscillation; said hook having a chamber wherein said latch is mounted to oscillate for engaging and disengaging said trail eye and a hinge pin in said hook from which said latch is suspended.

4. A limber coupling comprising a limber hook; a trail eye fitting closely around said hook; a latch; a nose on said latch normally projecting beyond the surface of said hook actuated by spring pressure; an annular recess in said trail eye engaging said nose to lock said limber hook and trail eye together while allowing movement of said trail eye around the vertical axis of the limber hook.

5. A limber coupling comprising a limber hook; a trail eye fitting closely around said hook; a latch; a nose on said latch normally projecting beyond the surface of said hook actuated by spring pressure; a pawl hinged on said latch and normally hanging free; an abutment in said limber hook; said pawl constructed to engage said abutment, when manipulated in preparation for unlimbering, thereby partially withdrawing said nose from engagement with said trail eye.

6. A limber coupling comprising a limber hook; a trail eye fitting closely around said hook; a latch; a nose on said latch normally projecting beyond the surface of said hook actuated by spring pressure; a pawl hinged on said latch and normally hanging free; an abutment in said limber hook; said pawl constructed to engage said abutment, when manipulated in preparation for unlimbering, thereby partially withdrawing said nose from engagement with said trail eye, said trail eye causing the complete withdrawal of said nose in unlimbering whereby said pawl, actuated by its weight, is disengaged from said abutment, allowing said latch to regain its normal position actuated by spring pressure.

7. A limber coupling comprising a limber hook; a trail eye fitting closely around said hook; a latch; a nose on said latch normally projecting beyond the surface of said hook actuated by spring pressure; an aperture in said hook for seating the latch; a hinge pin in said hook, upon which said latch is hung to oscillate; an annular recess in said trail eye engaging said nose to lock said limber hook and trail eye together while allowing movement of said trail eye around the vertical axis of the limber hook; a pawl hinged on said latch and normally hanging free; an abutment in said limber hook; said pawl constructed to engage said abutment, when manipulated in preparation for unlimbering, thereby partially withdrawing said nose from engagement with said trail eye; said trail eye causing the complete withdrawal of said nose in unlimbering whereby said pawl, actuated by its weight, is disengaged from said abutment, allowing said latch to regain its normal position actuated by spring pressure.

The foregoing specification signed at Barmen, Germany, this 17th day of April, 1912.

WILHELM MAYER. [L. S.]

In presence of—
 HELEN NUFER,
 ALBERT NUFER.